US012784040B2

(12) United States Patent
Al Suwailem et al.

(10) Patent No.: US 12,784,040 B2
(45) **Date of Patent: *Nov. 3, 2026**

(54) BLOCKCHAIN BASED SMART VOUCHER SYSTEM

(71) Applicant: ISLAMIC DEVELOPMENT BANK INSTITUTE, Jeddah (SA)

(72) Inventors: Sami Al Suwailem, Jeddah (SA); Hilal Houssain, Jeddah (SA); Mohammed Obaidullah, Jeddah (SA)

(73) Assignee: ISLAMIC DEVELOPMENT BANK INSTITUTE, Jeddah (SA)

( * ) Notice: Subject to any disclaimer, the term of this patent is extended or adjusted under 35 U.S.C. 154(b) by 40 days.

This patent is subject to a terminal disclaimer.

(21) Appl. No.: 19/086,415

(22) Filed: Mar. 21, 2025

(65) Prior Publication Data

US 2025/0245654 A1 Jul. 31, 2025

Related U.S. Application Data

(62) Division of application No. 18/033,174, filed as application No. PCT/IB2020/060122 on Oct. 29, 2020, now Pat. No. 12,282,916.

(51) Int. Cl.
*G06Q 20/02* (2012.01)
*G06Q 20/06* (2012.01)
(Continued)

(52) U.S. Cl.
CPC ........... *G06Q 20/387* (2013.01); *G06Q 20/02* (2013.01); *G06Q 20/065* (2013.01);
(Continued)

(58) Field of Classification Search
CPC .... G06Q 20/387; G06Q 20/02; G06Q 20/065; G06Q 20/389; G06Q 20/407; G06Q 40/10; H04L 9/50
See application file for complete search history.

(56) References Cited

U.S. PATENT DOCUMENTS

| | | | |
|---|---|---|---|
| 11,132,704 | B2 | 9/2021 | Bishnoi et al. |
| 11,397,928 | B2 | 7/2022 | Song et al. |

(Continued)

FOREIGN PATENT DOCUMENTS

| | | | |
|---|---|---|---|
| CA | 3039896 | A1 | 4/2018 |
| CN | 107146101 | A | 9/2017 |

(Continued)

OTHER PUBLICATIONS

International Search Report for PCT/IB2020/060122, prepared by the Canadian Intellectual Property Office, mailing date, Jul. 5, 2021, 3 pages.

(Continued)

*Primary Examiner* — Azam A Ansari
(74) *Attorney, Agent, or Firm* — BROOKS KUSHMAN P.C.

(57) ABSTRACT

A computer-implemented blockchain based voucher method and system, the method including: recording in a blockchain network, with a user computing device of a user with at least one blockchain based voucher, a purchase request that identifies a proposed purchase with an authorized provider, a purchase amount and the voucher, wherein the voucher comprises a sum of cryptocurrency bound by a set of rules earmarking the voucher to be usable only in transactions between the user and any of a set of one or more authorized providers of goods or services, and wherein the purchase amount is a value that is less than or equal to the total value of the voucher; validating, by the blockchain network, eligibility of the purchase request, based on the set of rules binding the voucher; unbinding the set of rules from the purchase amount of the voucher when the proposed purchase is completed.

10 Claims, 6 Drawing Sheets

(51) Int. Cl.

| | |
|---|---|
| ***G06Q 20/38*** | (2012.01) |
| ***G06Q 20/40*** | (2012.01) |
| ***G06Q 40/10*** | (2023.01) |
| ***H04L 9/00*** | (2022.01) |

(52) U.S. Cl.

CPC ......... *G06Q 20/389* (2013.01); *G06Q 20/407* (2013.01); *G06Q 40/10* (2013.01); *H04L 9/50* (2022.05)

(56) References Cited

U.S. PATENT DOCUMENTS

| | | | |
|---|---|---|---|
| 2004/0260607 | A1 | 12/2004 | Robbins et al. |
| 2019/0012249 | A1 | 1/2019 | Mercuri et al. |
| 2019/0139032 | A1 | 5/2019 | Heavey |

FOREIGN PATENT DOCUMENTS

| | | | |
|---|---|---|---|
| CN | 109214792 | A | 1/2019 |
| CN | 109255720 | A | 1/2019 |
| CN | 109360016 | A | 2/2019 |

OTHER PUBLICATIONS

Allessie, D., et al., “JRC Science for Policy Report”, “Blockchain for digital government: An assessment of pioneering implementations in public services Authors”, Jan. 1, 2019, Publications Office of the European Union, Luxembourg, ISBN: 978-92-7-600582-7, pp. 1-88, XP055937840, DOI: 10.2760/93808.

BLOCKCHAIN BASED SMART VOUCHER SYSTEM

CROSS-REFERENCE TO RELATED APPLICATIONS

This application is a divisional of U.S. application Ser. No. 18/033,174 filed Apr. 21, 2023, which is a U.S. national phase of International Application No. PCT/IB2020/060122, filed on Oct. 29, 2020, the disclosures of which are hereby incorporated in their entirety by reference herein.

TECHNICAL FIELD

The present application relates to blockchain based vouchers (which may be referred to as 'Smart Vouchers'), and in particular, to a voucher system allowing a regulating authority (such as a government authority) to authorize selected good and/or service providers (such as privatised enterprises, schools and hospitals) to provide selected goods and/or services, to eligible parties (e.g. beneficiaries). This can be funded through sales tax proceeds to provide such goods and/or services to disadvantaged groups or individuals.

BACKGROUND

It is known for governmental or other institutions to distribute aid among disadvantaged groups. In one existing approach to accomplishing this goal, the institutions use tax income to subsidise essential goods and services by providing vouchers as aid to disadvantaged groups (e.g., in education systems through "school vouchers" or food coupons). In an alternative approach, the private sector provides such goods and services in return for government issued vouchers (which are supported by sales-tax revenue), to support disadvantaged groups. As the goods and services are provided through the market, competition is encouraged, which may improve the quality of the provided goods and services.

However, it is often difficult to trace, verify and monitor this governmental or organisational aid in a real time environment. Further, it is problematic to identify if such aid is lost to fraud, waste, or have ended up in the hands of corrupt institutions or individuals. A black market may even be created if the voucher ends up in the hands of corrupt or inefficient institutions or individuals.

SUMMARY

The following presents a simplified summary in order to provide a basic understanding of some aspects of the present invention. The summary is not an extensive overview of the present invention. It is an object of the present invention application to address at least some of the challenges faced by known voucher or coupon systems.

According to a first aspect of the invention, there is provided a computer-implemented blockchain based voucher method, comprising:

recording in a blockchain network, with a user computing device of a user with at least one blockchain based voucher, a purchase request that identifies a proposed purchase with an authorized provider, a purchase amount (that is, the proposed purchase price) and the voucher (and optionally, for greater security, a user identifier associated with the user), wherein the voucher comprises a sum of cryptocurrency bound by a set of rules (such as contained in a digital contract) earmarking the voucher to be usable only in transactions between the user and any of a set of one or more authorized providers of goods or services (including both goods and services, and in some embodiments the voucher has a predefined, finite period of validity-after which the voucher becomes invalid or is invalidated);

validating, by the blockchain network, eligibility of the purchase request, based on the set of rules binding the voucher;

unbinding the set of rules from the purchase amount of the voucher (that is, the purchase price to be paid using the voucher, which may be less than or equal to the value of the at least one voucher) when the proposed purchase is completed; and recording a cryptocurrency transaction in the blockchain network, the cryptocurrency transaction comprising a transfer of the purchase amount from a user identifier associated with the user to an authorized provider identifier associated with the authorized provider.

In an embodiment, the authorized provider can then choose either:

to redeem the voucher from a regulating authority that issued the voucher; or to use the voucher in an ordinary transaction (after the voucher has been unbound from the set of rules (the unbound voucher being then termed a "free voucher").

Thus, the blockchain based voucher method uses a market system that can be employed to improve quality of public services, while offering a reliable and sustainable mechanism for supporting disadvantaged groups in society. It can be used not only to improve the quality of existing services, but also to utilize idle capacities to produce new goods and services and supporting disadvantaged groups simultaneously.

In the present invention, potential beneficiaries can be verified as eligible to receive goods and/or services (and therefore to be eligible beneficiaries) through a blockchain network that comprises or is accessible by (i) eligible beneficiaries, (ii) regulating authorities (such as a governing or other authority that regulates the system), and (iii) selected providers (of goods and/or services). The blockchain based vouchers are issued to eligible beneficiaries. The voucher, when issued, comprises cryptocurrency that is earmarked for use, for example, with the authorized providers only (and optionally with predefined sets of goods and/or services), to minimize the risk of fraudulent transactions. The implementation of such earmarking is difficult, if not impossible, using conventional technologies, but is feasible through the use of blockchain technology. At the technical level, this binding is implemented—in one example—by including a binary flag in the structure of the voucher; the flag has a Boolean value of True or False (or the equivalent thereof). If the flag is True, the predefined rules in a digital contract will be applied to the use of the voucher. In this example, once the beneficiary uses the voucher to make a purchase (and, optionally, has not indicated dissatisfaction with the purchase), the voucher (or a portion of the cryptocurrency thereof) is be moved to the authorized provider, and the associated flag value changes to False for that voucher (or portion of the cryptocurrency thereof), which removes the rules such that the authorized provider can use the cryptocurrency without restriction.

As used herein, the cryptocurrency can comprise coins, tokens, or any other blockchain based unit of exchange that will be apparent to persons having skill in the relevant art; the term 'voucher' is used to refer to a blockchain based voucher, coupon or certificate that comprises cryptocurrency that may be used to purchase goods and/or services at one or more authorized providers and earmarked with binding rules when issued.

The vouchers are not restricted to use with existing services. They may also be used with newly created services. The government may invite investors and entrepreneurs to undertake building services (infrastructure facilities; schools, etc.) by guaranteeing them the income from eligible beneficiaries, as above. In this manner, the vouchers can be used to utilise what might be otherwise idle capacities of the community.

In an embodiment, the method further comprises: receiving, by the blockchain network, a voucher application transaction from the user, the voucher application transaction comprising at least a user identifier associated with the user; verifying, via the blockchain network, that the user is an eligible user, wherein eligibility of the user is checked by comparing data associated with the user with one or more eligibility criteria (defined by a regulating authority); generating (such as by a regulating authority server) a voucher by binding a sum of cryptocurrency with the set of rules; and recording in the blockchain network a voucher allocation transaction wherein the voucher is allocated to the user identifier. In one example, the voucher allocation transaction includes allocating the voucher from a regulating authority identifier to the user identifier.

In one embodiment, the method further comprises: generating, by the user computing device, a refund request transaction configured to request (such as within a predefined period of time from the date of the transaction) a refund corresponding to part or all of the purchase transaction. The user might initiate such a refund request when, for example, he or she is dissatisfied with the quality of the goods and/or services. In this embodiment, the refund request transaction comprises a refund amount of the cryptocurrency and a transaction identifier identifying the purchase transaction, and the method further comprises recording the refund request transaction in the blockchain network, such that the refund request transaction is received by an authorized provider computing system; approving, by the authorized provider computing system, the refund request transaction and recording a refund approval transaction indicative thereof in the blockchain network; generating a new voucher by binding a sum of cryptocurrency with the set of rules, the new voucher comprising the refund amount of cryptocurrency; and recording a refund voucher allocation transaction in the blockchain, the refund voucher allocation transaction comprising a transfer of the new voucher from the authorized provider identifier to the user identifier.

In an embodiment, the method includes unbinding the set of rules from the purchase amount of the voucher after expiry of a refund period for making a refund without a refund being made. The unbinding of the set of rules allows the service provider to use the now free voucher for exchange with any other party on the network. In this embodiment, the method may further comprise subjecting the voucher once unbound from the set of rules to a hoarding tax scheme. Such a hoarding tax scheme (such as a Gessell tax) can be useful in stabilizing the value of the cryptocurrency.

In an embodiment, the method further comprises: generating, by an authorized provider computing system, a redemption request transaction for a requested redemption, wherein the redemption request transaction includes a redemption amount of one or more vouchers; recording the redemption request transaction in the blockchain network, such that the redemption request transaction is received by an regulating authority server; validating, by the blockchain network, the eligibility of the requested redemption based on a set of one or more redemption conditions; and recording a voucher redemption transaction in the blockchain, the voucher redemption transaction comprising a transfer of the redemption amount from the authorized provider identifier to a regulating authority identifier associated with the regulating authority.

In an example, the set of redemption conditions includes a redemption grace period and/or a satisfactory transaction evaluation by the user. In another example, the method further comprises approving the proposed redemption transaction, via the blockchain network. In another example, the method further comprises the regulating authority electronically paying the authorized provider the redemption amount in standard currency or cryptocurrency.

In an embodiment, the method comprises issuing one or more vouchers that:

(i) are valid for paying tax to a taxation authority once unbound; and/or
(ii) are bound by one or more rules as being usable to pay tax to a taxation authority such that the taxation authority is effectively an authorized provider; and/or
(iii) are associated with a tax credit suitable for discharging a tax obligation to a taxation authority.

In an embodiment, the method comprises issuing one or more vouchers that are bound by a set of rules earmarking the vouchers to be usable only in transactions between the user and any of a predefined subset of the authorized providers, or in purchasing a predefined set of goods and/or services, and are issued in advance of when any associated taxes, or taxes generally in an instant tax period, become payable by authorized providers accepting the vouchers so earmarked.

According to a second aspect, the present invention provides a computer program product comprising computer program code configured to, when loaded into a computing system and executed thereon, cause the computing system to perform the method of the first aspect. According to this aspect, there is also provides a computer-readable medium, comprising such a computer program product.

According to a third aspect, the present invention provides a blockchain based voucher system, configured to implement the method of the first aspect. For example, according to this aspect, there is provided blockchain based voucher system, comprising:

a blockchain controller, controllable by a user computing device of a user (a device that may form a part of the system) with at least one blockchain based voucher, configured to initiate recordal in a blockchain network of a purchase request that identifies a proposed purchase with an authorized provider, a purchase amount and the voucher, wherein the voucher comprises a sum of cryptocurrency bound by a set of rules earmarking the voucher to be usable only in transactions between the user and any of a set of one or more authorized providers of goods or services; and a blockchain network configured to i. validate eligibility of the purchase request transaction, based on the set of rules binding the voucher;
ii. unbind the set of rules from the purchase amount of the voucher when the proposed purchase transaction is completed; and
iii. record a cryptocurrency transaction in the blockchain network, the cryptocurrency transaction comprising a transfer of the purchase amount from a user identifier associated with the user to an authorized provider identifier associated with the authorized provider.

In an embodiment, the system further comprises a regulating authority server, wherein:

the blockchain network is configured to receive a voucher application transaction from the user, the voucher application transaction comprising at least a user identifier associated with the user, and to verify that the user is an eligible user by comparing data associated with the user with one or more eligibility criteria; and the regulating authority server is configured to initiate generation of a voucher by the blockchain network, said generation of the voucher comprising binding a sum of cryptocurrency with the set of rules, and recordal in the blockchain network of a voucher allocation transaction (which may include allocating the voucher from a regulating authority identifier to the user identifier) whereby the voucher is allocated to the user identifier.

In an embodiment, the regulating authority server is configured to initiate generation of one or more vouchers that:

(i) are valid for paying tax to a taxation authority once unbound; and/or (ii) are bound by one or more rules as being usable to pay tax to a taxation authority such that the taxation authority is effectively an authorized provider; and/or (iii) are associated with a tax credit suitable for discharging a tax obligation to a taxation authority.

In an embodiment, the regulating authority server is configured to initiate generation of one or more vouchers that are bound by a set of rules earmarking the vouchers to be usable only in transactions between the user and any of a predefined subset of the authorized providers, or in purchasing a predefined set of goods and/or services, and are issued in advance of when any associated taxes, or taxes generally in an instant tax period, become payable by authorized providers accepting the vouchers so earmarked.

In an embodiment, the user computing device is configured to generate a refund request transaction adapted to request a refund corresponding to part or all of the purchase transaction, the refund request transaction comprising a refund amount of the cryptocurrency and a transaction identifier identifying the purchase transaction, and to initiate recordal of the refund request transaction in the blockchain network, such that the refund request transaction is received by an authorized provider computing system that is configured to approve the refund request transaction and initiate recordal of a refund approval transaction indicative thereof in the blockchain network; and the blockchain network is configured to generate a new voucher by binding a sum of cryptocurrency with the set of rules, the new voucher comprising the refund amount of cryptocurrency, and to record a refund voucher allocation transaction in the blockchain, the refund voucher allocation transaction comprising a transfer of the new voucher from the authorized provider identifier to the user identifier.

In an embodiment, the blockchain network is configured to unbind the set of rules from the purchase amount of the voucher after expiry of a refund period for making a refund without a refund being made. In an example, the blockchain network is configured to subject the voucher to a hoarding tax scheme once the voucher has been unbound from the set of rules. In another embodiment, the system further comprises: an authorized provider computing system, configured to generate a redemption request transaction for a requested redemption, wherein the redemption request transaction includes a redemption amount of one or more vouchers; recording the redemption request transaction in the blockchain network, such that the redemption request transaction is received by an regulating authority server; validating, by the blockchain network, the eligibility of the requested redemption based on a set of one or more redemption conditions; and recording a voucher redemption transaction in the blockchain, the voucher redemption transaction comprising a transfer of the redemption amount from the authorized provider identifier to a regulating authority identifier associated with the regulating authority.

The Voucher

The Voucher comprises a defined sum of cryptocurrency to be used by a beneficiary. Generally, the voucher will have a finite temporal validity, so be valid for only a predefined period of time (e.g. from its date of issue). Thus, the voucher may be configured to expire after a predefined period of time, or include a timestamp such that it will be invalid, for example, either after that timestamp (e.g. the timestamp indicates an expiry time) or after a predefined period of time following that timestamp (e.g. the timestamp indicates the start of a period of validity). The cryptocurrency may be in the form of a blockchain token or a cryptocurrency issued by a regulating authority to the beneficiary user groups to pay for goods or services. Authorized providers (such as private businesses running privatised services) may then redeem the vouchers with the regulating authority for standard currency (whether as cash, cheque, bank account credit or otherwise), or use it in other transactions after it has been converted into a free (that is, unbound) voucher.

Verification of Eligible Users

Users can be verified as eligible through having the following, inter alia, as members of the blockchain network (who, collectively, can verify the eligibility of a user):

1. Employers
2. Employees
3. Household members
4. Banks
5. Other relevant members, such as landowners, etc Voucher Use The cryptocurrency is a complementary currency intended to supplement the official or standard currency and not to compete with it. Hence, the exchange rate between the cryptocurrency and the official currency should be kept as stable as possible. There should be minimum room for speculation, and thus the exchange should be monitored and controlled by the regulating authority.

Moreover, this exchange rate can optionally be stabilized by adjusting the cryptocurrency supply, such as by application of a hoarding tax scheme. This may be in the form of a Gesell tax, which is a hoarding tax that encourages spending and discourages speculation. A Gesell tax is difficult to apply to conventional money, owing to problems associated with real-time transaction monitoring and traceability, but rendered feasible-according to the present invention-through the use of smart contracts on the blockchain. A Gesell tax can be applied, in one example, as follows: authorized providers are given a grace period of, say, 60 days, from the date a voucher is received and converted into unrestricted cryptocurrency as a free voucher. Afterwards, if a free voucher is not spent or redeemed, a daily rate of, say, 0.0014% (equivalent to 0.5% p.a.) is deducted from the value of the free voucher account. This is not a depreciation rate; rather, 1 unit in each 1,000 is deducted from the corresponding account on a daily basis after the grace period has expired. The proceeds are collected into a separate account to be used to, inter alia, stabilize and support the system.

The cryptocurrency need not increase the supply of the official currency. Such an increase can be avoided by preventing the conversion of the cryptocurrency into foreign currencies. This restriction does not usually work using conventional technologies and leads to black markets. However, with the blockchain technology, each transaction is transparent and fully controlled, so it is envisaged that the restriction is likely to be effective.

The cryptocurrency is convertible to the official currency, but this need not lead to inflation and deterioration of the exchange rate with foreign currencies because the total money supply of the official currency at foreign exchange markets is the same with and without the cryptocurrency.

It should be noted that any of the various features of each of the above aspects of the invention, of the specific embodiments and of the claims can be combined as suitable and desired.

BRIEF DESCRIPTION OF THE DRAWINGS

For a more complete understanding of the present invention, embodiments thereof are now described, by way of example, by reference to the accompanying drawings, in which.

DETAILED DESCRIPTION

Figure 1:
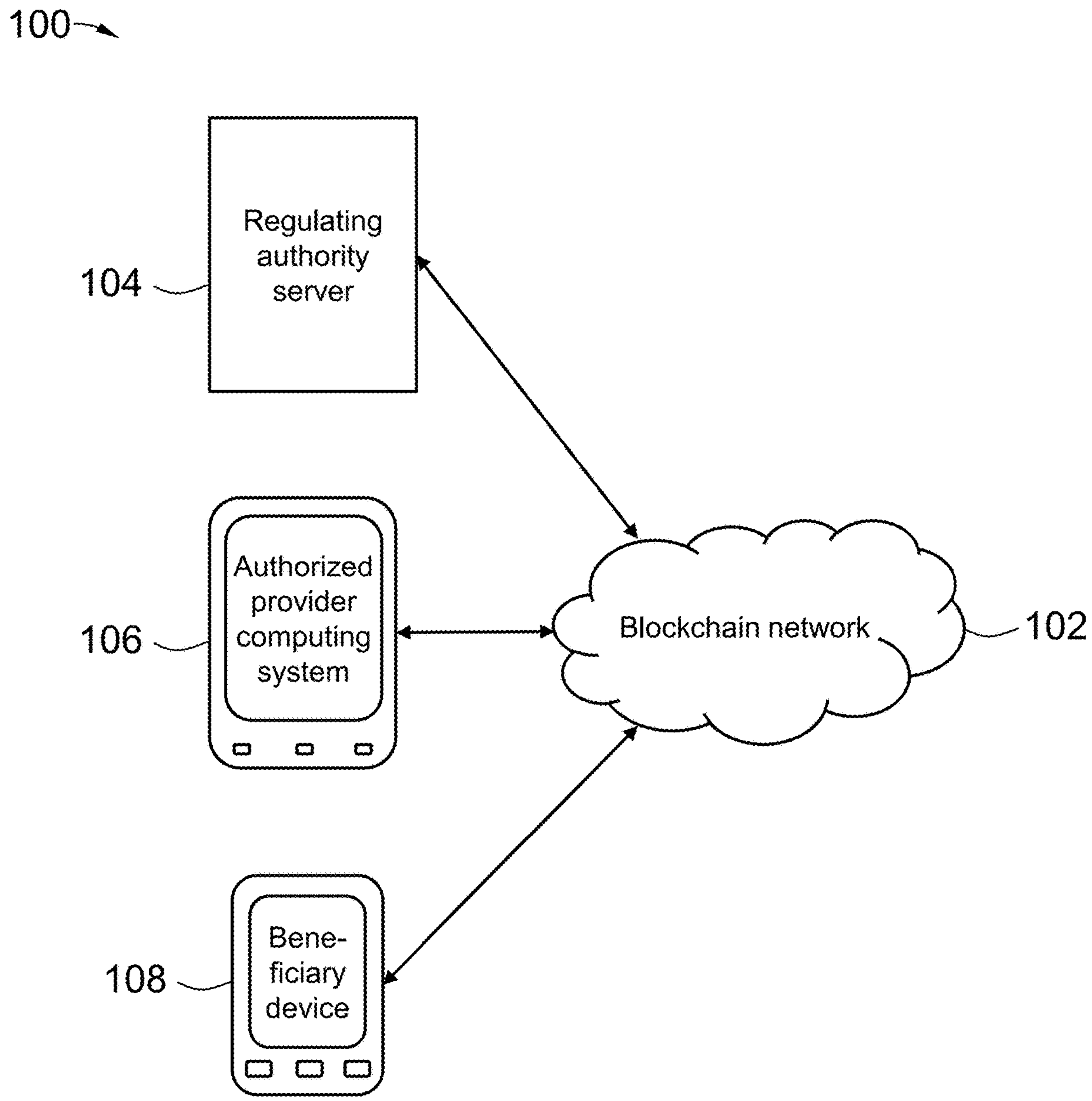
FIG. 1 is a schematically illustration of a blockchain based voucher system according to an embodiment of the present invention.

Embodiments of the present invention will be further described hereinafter with reference to the accompanying drawings. It is to be understood that specific embodiments described herein are only intended to explain the present application, and are not taken to limit the present application. Further, it will be appreciated that the examples provided represent only one of many possible implementations of the present application. Modifications and variations are possible in light of the above teachings or may be acquired from practicing of the present application, without departing from the breadth or scope.

It is also to be understood that the following claims are intended to cover all of the generic and specific features of the present application herein described and all statements of the scope of the present application which, as a matter of language, might be said to fall therebetween.

As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

As used herein, the term "blockchain" refers to a public ledger of all transactions of a blockchain based network. One or more computing devices may constitute a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a transaction amount, such that the blockchain records how much is attributable to a specific address. In some instances, the transactions are financial and while in others, they are not financial, or might include additional or different information, such as a source address, timestamp, etc. In some embodiments, a blockchain may also alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction.

Overview

An exemplary procedure by which a blockchain based voucher system according to an embodiment of the present invention is created and used is as follows.

1. A regulating authority (such as a government-whether local, state, provincial, national or otherwise) designates certain providers of goods and/or services (e.g. education, health care, energy, etc.) as authorized to provide such goods and/or services to eligible beneficiaries using the system. The authorized providers may, for example, be either managing existing privatised services, or establishing new facilities to offer such services.

2. In return, in this embodiment, the authorized providers pay the regulating authority, such as in the form of license fees and sales tax (e.g. VAT or GST); this funds the operation of the system. (In other embodiments, however, there need not be a direct connection between the funding of the operation of the system and payments by the regulating authority.)

3. The regulating authority announces that it will issue blockchain based vouchers to eligible beneficiaries, such as by utilising tax revenues to support disadvantaged groups, as a substitute for direct governmental or other provision and/or subsidy of goods and/or services previously provided as public services. (Alternatively, the regulating authority may decide to provide privately offered goods and/or services via the voucher system.)

4. Potential beneficiaries/users apply for vouchers, and their applications are checked and, if satisfactory, validated through a blockchain network.

5. The blockchain network includes (i) beneficiaries, (ii) regulating authorities, and (iii) authorized providers.

The regulating authority issues the vouchers to eligible beneficiaries. Each of the vouchers comprises a sum of cryptocurrency that is initially earmarked for use in purchasing (i) prescribed goods and/or services, and/or (ii) from authorized providers. However, once the cryptocurrency has been paid to the authorized providers, and the beneficiary does not indicate dissatisfaction with the goods or services, the cryptocurrency becomes unrestricted and may be used by the authorized providers at their discretion.

7. Eligible beneficiaries pay for the goods and/or services using the vouchers.

8. The authorized providers redeem the cryptocurrency from or via the regulating authority, by submitting the cryptocurrency and, in consideration, receiving the equivalent standard currency (or the equivalent minus an applicable fee or tax).

9. This redemption is executed through an exchange platform managed by the regulating authority, which also manages the value of the vouchers.

Redemption and Refund

The authorized providers are not, in this embodiment, able to redeem the received cryptocurrency unless the beneficiaries are satisfied with the purchased goods or services. Accordingly, the authorized providers are eligible for redemption subject to two conditions:

1. after a predefined period of time since the purchase, e.g. one month, so that the beneficiary has time to complain; and/or 2. after the beneficiary submits an evaluation that the received goods or services as satisfactory (or refrains from lodging a complaint within a predefined period) through the blockchain network.

If the beneficiary is not satisfied, the beneficiary is entitled to a refund. The refund is restricted to being in the form of another voucher (hence in cryptocurrency: the beneficiary cannot receive a refund in standard currency) or a credit to an existing voucher held by the beneficiary.

Additionally, beneficiaries cannot exchange the vouchers for standard currency unless the designated goods or services have been offered in accordance with official agreements.

Currency Management

An example of a currency management scheme of this embodiment is as follows.

The amount of cryptocurrency issued by way of the vouchers is, in this embodiment, capped by the proceeds of (1) license fees, plus (2) sales tax of the prescribed goods and/or services, minus (3) the associated costs of management. The vouchers are allocated to eligible beneficiaries based on, for example, their income or—as in this embodiment—their income relative to the total income of all eligible beneficiaries.

The total budget for the vouchers to be provided to eligible beneficiaries for use in acquiring the prescribed goods and/or services from the authorized providers is determined by:

$$B = LF + tS - c, \tag{1}$$

where B is the total budget for the vouchers, LF is license or other fees paid by the authorized providers, t is the sales tax rate attracted by the prescribed goods and/or services, S is total sales of the authorized providers, and c is the cost of managing the process.

In this embodiment, these are annual figures and thus the cryptocurrency allocated to the vouchers is accordingly determined annually. Hence, the cryptocurrency issued via the Vouchers is backed by the provision of real goods and/or services. (In other embodiment, other accounting periods may be employed.)

The amount of cryptocurrency allocated by way of a voucher or vouchers to an individual eligible beneficiary is determined by:

$$SV_i = \alpha_i B, \tag{2}$$

where SVi, is the cryptocurrency issued to the beneficiary i as one or more vouchers, and $$\alpha_i = \frac{y_i^{-1}}{\sum_i y_i^{-1}} \tag{3}$$

where $y_i^{-1}$ is the inverse of disposable income of beneficiary i. To make the calculations smooth and avoid mathematical singularities, disposable income is capped by 1 from below (i.e. $y_i \geq 1$), such that $0 < y_i^{-1} \leq 1$.

The income or inverse income can be used as a screening criterion to decide the eligibility of beneficiaries. For example, a potential beneficiary may be deemed eligible if his or her inverse income is greater than a predefined threshold, or in other cases greater than or equal to a predefined threshold. Alternatively, a potential beneficiary may be deemed eligible if his or her income is below a predefined threshold, or in other cases less than or equal to a predefined threshold. In some implementations, different thresholds may employed according to the nature or identity of the goods and/or services for which the sought voucher(s) is configured to be redeemed, and/or according to the circumstances of the potential beneficiary. For example, a progressively lower inverse income threshold may be applied as the number of dependents of the potential beneficiary increases, if the goods and/or services purchasable with the proposed voucher are essentials such as food or accommodation.

In this embodiment, the total cryptocurrency allocated to the vouchers is capped by a budget B, so:

$$B = \sum_i SV_i. \tag{4}$$

In other embodiments, the total cryptocurrency allocated to the vouchers is capped according to a budget determined by a different set of other parameters.

FIG. 1 is a schematic illustration of a blockchain based voucher system 100 according to an embodiment of the present invention. System 100 includes a blockchain network 102 that, in this embodiment, includes a regulating authority computing system in the form of a regulating authority server 104, a plurality of authorized provider computing systems 106 of respective authorized providers and a plurality of user computing devices in the form of beneficiary computing devices 108 of respective users (termed beneficiaries in this embodiment). For simplicity, however, FIG. 1 and the following description refer to a single authorized provider computing system 106 and a single beneficiary computing device 108.

It will be appreciated that, although blockchain network 102 includes computing devices of the various parties (viz. the beneficiaries, the authorized providers and the regulating authority) of system 100, the blockchain that records transactions between these parties (or between their computing devices) may be stored in another blockchain network (comprising none of regulating authority server 104, authorized provider computing systems 106 and beneficiary computing devices 108), or in a blockchain network that includes some but not all of regulating authority server 104, authorized provider computing systems 106 and beneficiary computing devices 108. In whatever form the blockchain network takes, blockchain network 102 can access the blockchain and initiate transactions that will be recorded in and modify the blockchain (e.g. using respective secret keys).

The computing devices 104, 106, 108 of the blockchain network 102 communicate via any suitable telecommunications network, such as the internet, and the devices 104, 106, 108 of blockchain network 102—as is described below—are computing devices specifically configured to perform the functions discussed herein. Authorized provider system 106 typically resides in or is associated with commercial premises or the like, so may be in the form of a desktop computer, mobile computing device or other point-of-sale device; beneficiary computing device 108 is typically a user's personal device, so is commonly in the form of a mobile device, such as a tablet computer or smartphone. Nonetheless, the beneficiary may also use system 100 over the telecommunications network while at, for example, home or work, so beneficiary device 108 may be in the form of a desktop or laptop computer. In short, each of these computing devices 104, 106, 108 may assume any suitable form, mobile or otherwise, such as a desktop computer, laptop computer, notebook computer, tablet computer, cellular phone, smart phone, smart television, wearable computing device, implantable computing device, etc, provided they have sufficient computing capacity and are connectable to the telecommunications network.

In this embodiment, a Beneficiary Identifier (or ID) uniquely associated with the beneficiary, an Authorized Provider Identifier (or ID) uniquely associated with the authorized provider, and a Regulating Authority Identifier (or ID) uniquely associated with the regulating authority are stored in respective computing devices 104, 106, 108, such that blockchain network 102 can uniquely identify users (of or corresponding to computing devices 104, 106, 108) of blockchain network 102. In certain embodiments, these identifiers are optionally implemented as blockchain wallets or addresses.

Figure 2:
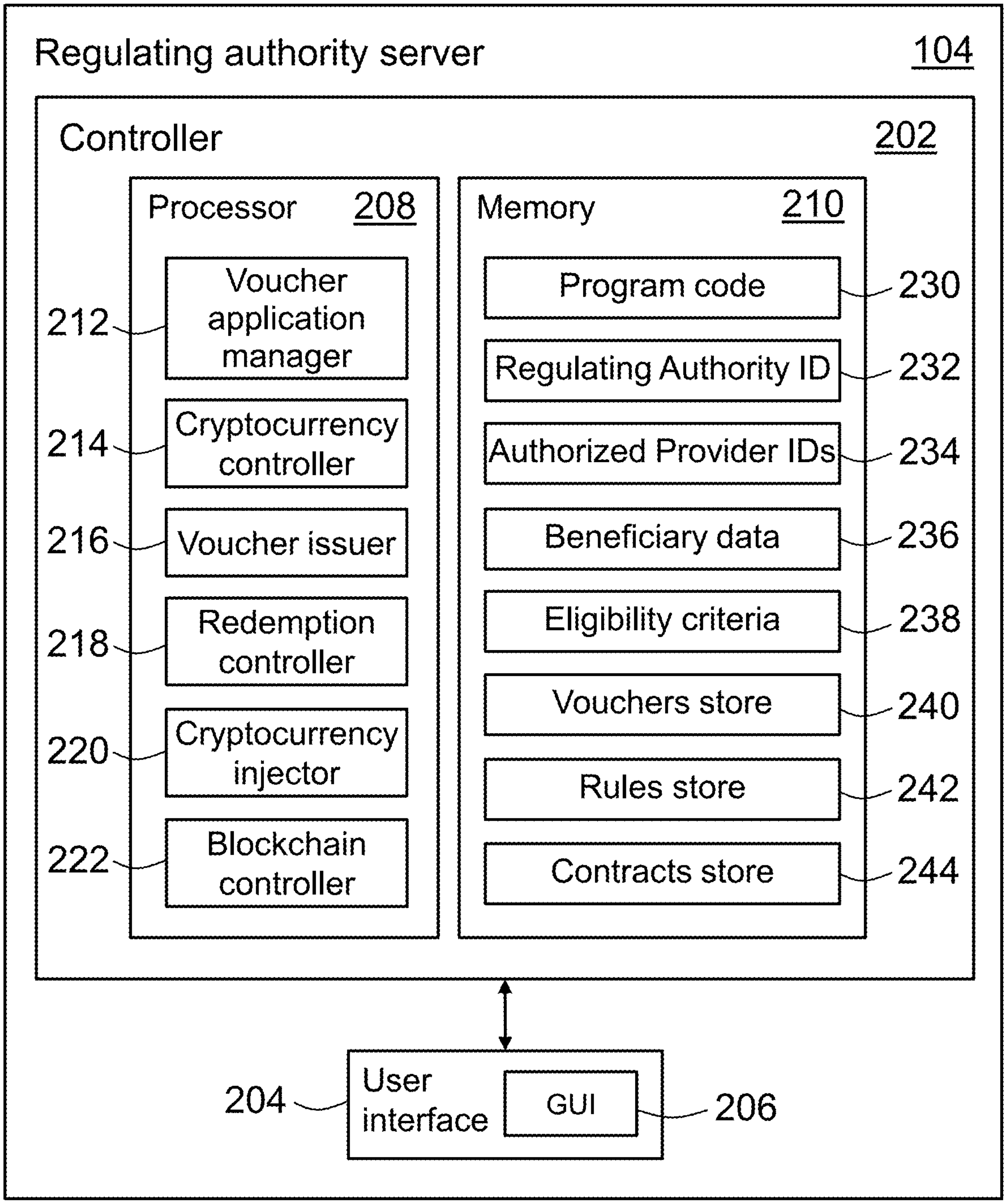
FIG. 2 is a block diagram overview of the regulating authority server of the blockchain based voucher system of FIG. 1.

FIG. 2 is a schematic view of regulating authority server 104 of system 100. Regulating authority server 104 includes a controller 202 and a user interface 204 (including a GUI 206). Controller 202 includes a processor 208 and memory 210. The term "processor" is used to refer to any device or devices that can process program instructions (such as in the form of program code stored in memory 210) and may comprise a microprocessor, microcontroller, programmable logic device or other computational device, a general purpose computer (e.g. a PC) or a server. Typically, memory 210 (and each other memory of system 100, as described below) includes both volatile and non-volatile memory and more than one of each type of memory, with such memories being collectively represented by memory 210.

Processor 208 of regulating authority server 104 includes a voucher application manager 212, a cryptocurrency controller 214, a voucher issuer 216, a redemption controller 218, a cryptocurrency injector 220 and a blockchain controller 222 configured to record transactions in blockchain network 102 (such as under the control of cryptocurrency injector 220). Memory 210 includes program code 230, a regulating authority ID 232, authorized provider IDs 234, beneficiary data 236, eligibility criteria 238, vouchers store 240 (for storing records of issued vouchers), rules store 242 (which stores rules for binding vouchers) and contracts store 244 (which stores so-called 'smart' or digital contracts). The functions of these components are explained below by reference to the operation of system 100, while cryptocurrency controller 214 initiates cryptocurrency operations, including the earmarking of vouchers with binding rules from rules store 242 and the issuance of vouchers (under the control of voucher issuer 216).

Figure 3:
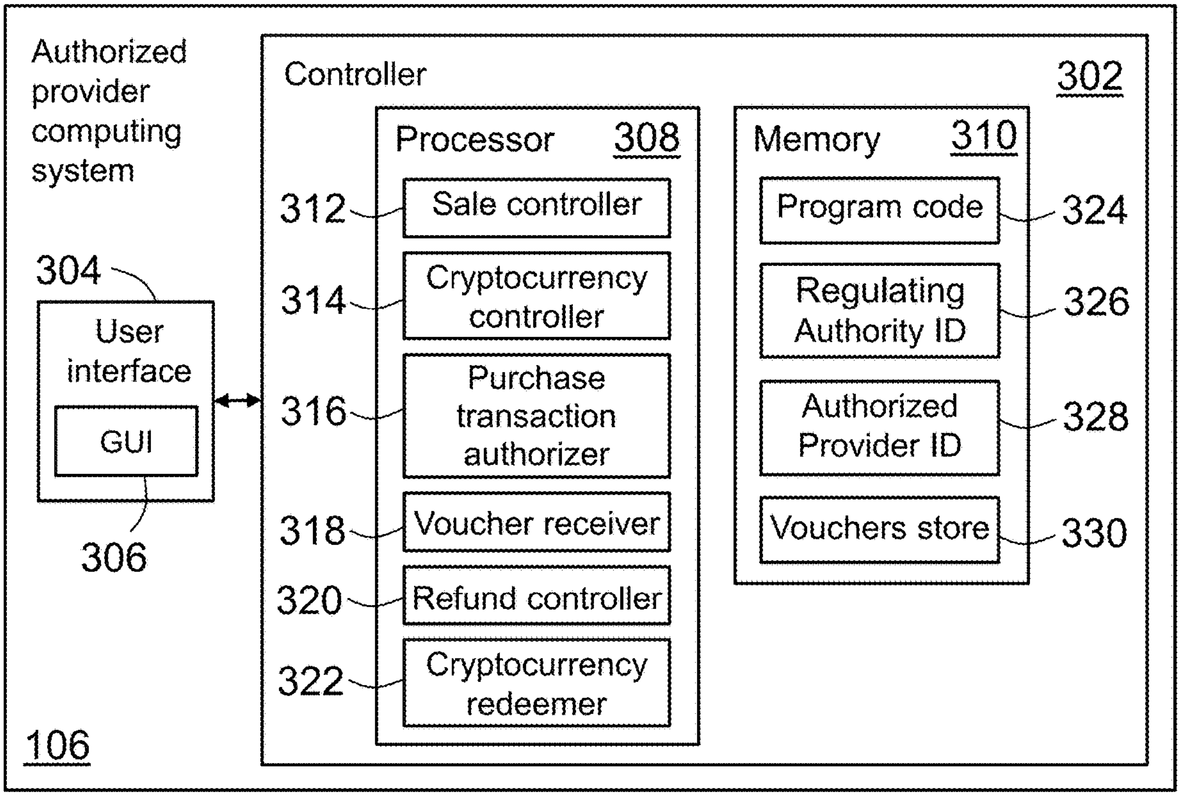
FIG. 3 is a block diagram overview of the authorized provider computing device of the blockchain based voucher system of FIG. 1.

FIG. 3 is a schematic view of authorized provider system 106 of system 100. Authorized provider system 106 includes a controller 302 and a user interface 304 (including a GUI 306). Controller 302 includes a processor 308 and memory 310. Processor 308 includes a transaction controller 312, a cryptocurrency controller 314, a purchase transaction authorizer 316, a voucher receiver 318, a refund controller 320, and a cryptocurrency redeemer 322. Memory 310 includes program code 324, a regulating authority ID 326, a authorized provider ID 328, and vouchers store 330 (which records details of cryptocurrency or vouchers held by the authorized provider). The functions of these components are also explained below by reference to the operation of system 100; cryptocurrency controller 314 initiates cryptocurrency operations, such as the receipt, refund and redemption of cryptocurrency.

Figure 4:
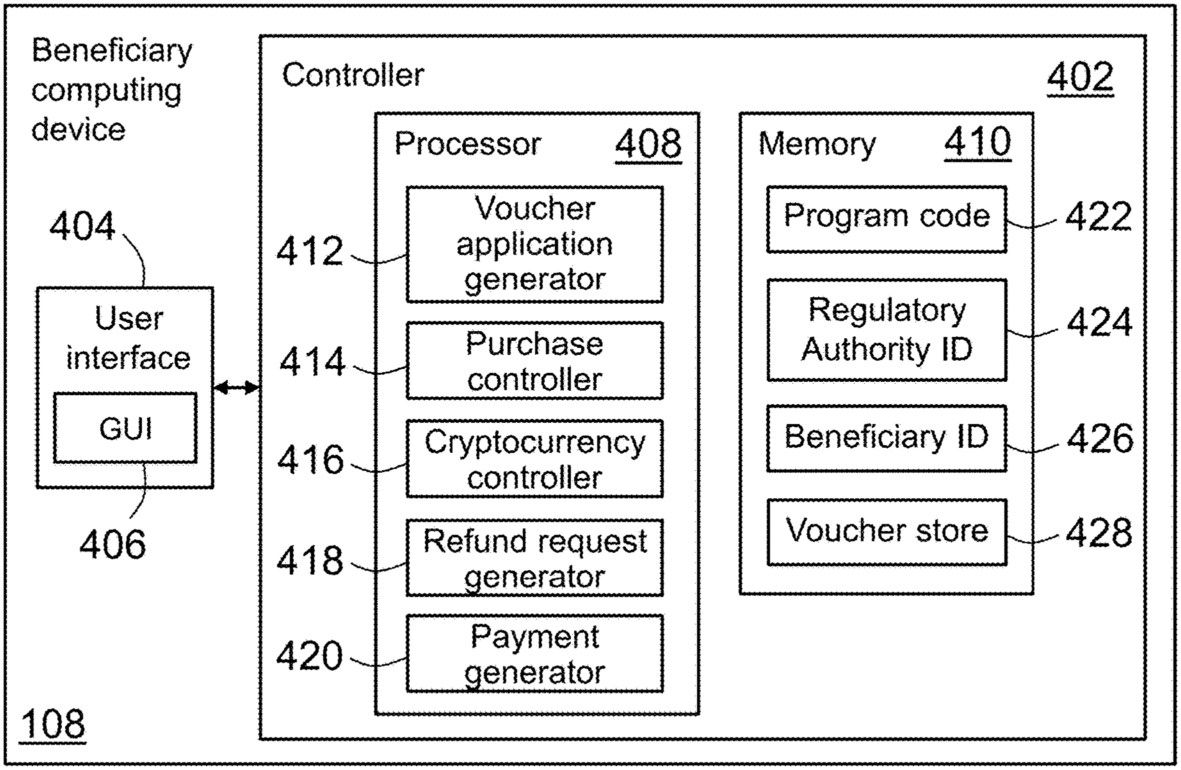
FIG. 4 is a block diagram overview of the beneficiary computing device of the blockchain based voucher system of FIG. 1.

FIG. 4 is a schematic view of beneficiary device 108 of system 100. Beneficiary device 108 includes a controller 402 and a user interface 404 (including a GUI 406). Controller 402 includes a processor 408 and memory 410. Processor 408 includes a voucher application generator 412, purchase controller 414, a cryptocurrency controller 416, a refund request generator 418, and a payment generator 420. Memory 410 includes program code 422, a regulating authority ID 424, a beneficiary ID 426, and vouchers store 428 (which records details of vouchers currently held by the beneficiary). The functions of these components are explained below by reference to the operation of system 100, while cryptocurrency controller 416 initiates cryptocurrency operations, such as to make payments (under the control of payment generator 420).

Figure 5:
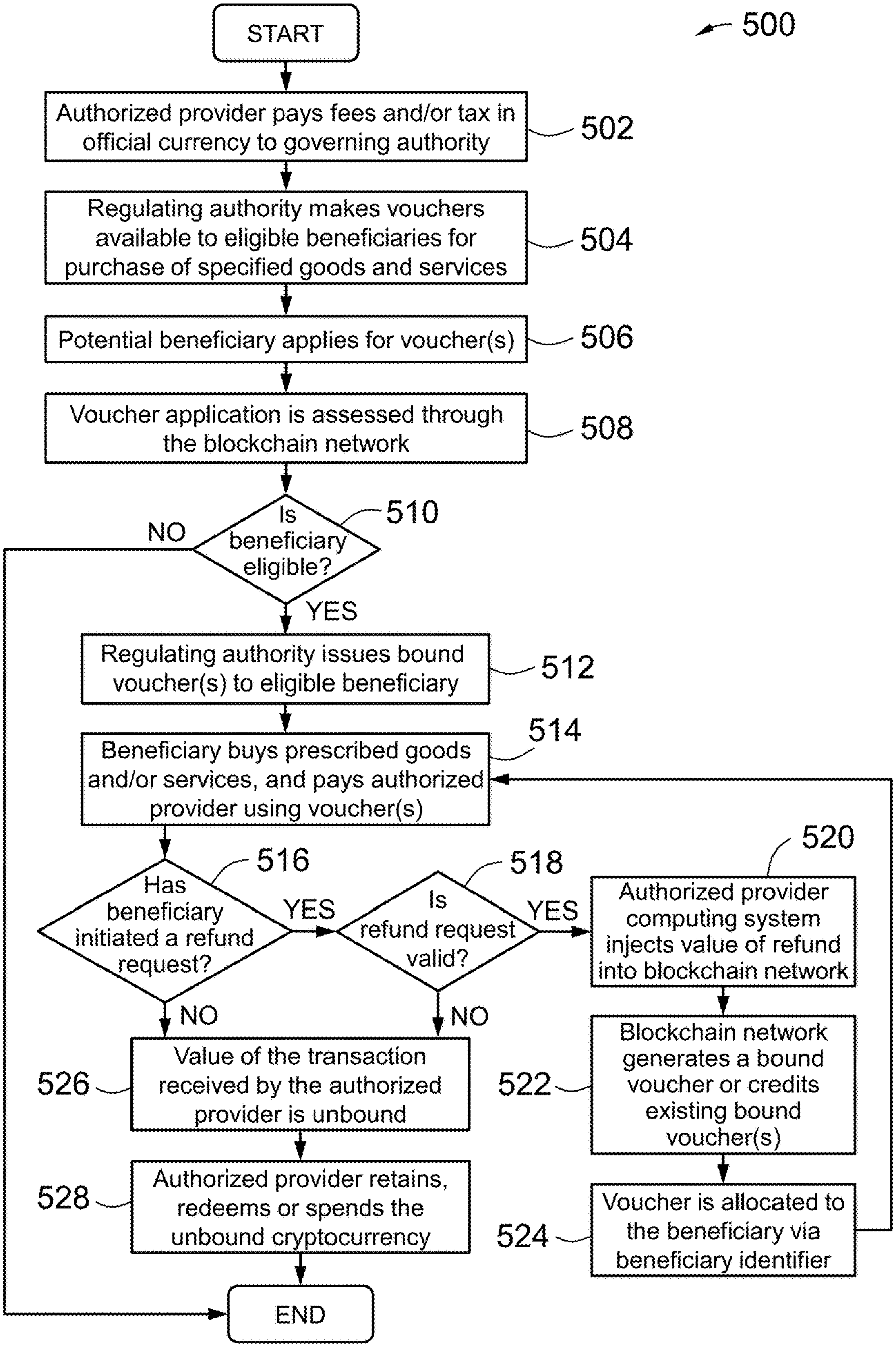
FIG. 5 is a flow diagram of the operation of system 100 for providing blockchain based vouchers of the blockchain based voucher system of FIG. 1.

FIG. 5 is a flow diagram 500 of the operation of system 100 for providing blockchain based vouchers. The operation of system 100 is explained by reference to a single beneficiary and a single authorized provider, but it will be understood that most implementations will involve plural beneficiaries and plural authorized providers. Indeed, some implementations may involve plural regulating authorities, that is, bodies authorized—such as by a government—to manage or govern the issuance, etc, of vouchers according to this embodiment.

Referring to FIG. 5, at preliminary step 502, the authorized provider pays fees (e.g. license fees) and/or taxes (e.g.

sales tax) in official currency to the regulating authority (such as by using authorized provider system 106 to make payment(s) to regulating authority server 104). Alternatively, the authorized provider may pay the fees and/or taxes to a party (such as the government) that makes them available—in full, in part or supplemented—to the regulating authority. It will therefore be appreciated that there need not be a direct link between the contributions made by the authorized provider to the revenue of the regulating authority, or to that part of the revenue that funds the voucher system. At preliminary step 504, the regulating authority makes vouchers according to this embodiment available (upon application) to eligible beneficiaries for purchase of specified goods and services via regulating authority server 104, including regulating authority server 104 communicating to beneficiary device 108 that vouchers will be issued to eligible beneficiaries upon request.

At step 506, a potential beneficiary controls beneficiary device 108 via GUI 406 to apply for one or more vouchers. In response, voucher application generator 412 generates and transmits a voucher application to regulating authority server 104; the voucher application includes the beneficiary ID 426 of the beneficiary.

At step 508, the voucher application is assessed by blockchain network 102 to determine whether the application should be approved (and hence the applying beneficiary deemed eligible for the voucher(s)). As described above, this process generally involves one or more digital contracts comparing the income of the potential beneficiary that has submitted the voucher application with a predefined inverse income or income threshold and/or taking into account other criteria (e.g. number of dependents), and deeming the beneficiary eligible if the applicable eligibility criteria are met. The digital contracts are advantageously recorded by the regulating authority (via regulating authority server 104) into blockchain network 102.

For example, blockchain controller 222 of regulating authority server 104 may be configured to store the Beneficiary IDs of all eligible beneficiaries in a document (which may be stored in blockchain network 102), such that a suitable digital contract can compare the applicant's ID with that document and thus determine that the applicant is eligible if a match is found. In another example, blockchain controller 222 is configured to store a predefined income threshold value, the applicants' incomes and a suitable digital contract on blockchain network 102, such that the digital contract can compare any particular applicant's income with that value and find that applicant eligible if the applicant's income is below that value.

At step 510, if the applying beneficiary is found to be ineligible, processing ends, but if voucher application manager 212 finds the applying beneficiary to be eligible, processing continues at step 512 where voucher issuer 216 of regulating authority server 104 issues the requested voucher(s) to the (eligible) beneficiary via a beneficiary identifier that is uniquely associated with the beneficiary and stored in beneficiary data 236 and beneficiary ID 426. Voucher issuer 216 issues the requested voucher(s) in earmarked form, bound by one or more rules read from rules store 242. That is, each issued voucher comprises a quantity of cryptocurrency calculated as described above, bound by applicable rules, both of which are be determined by voucher issuer 216 according to the details (primarily income) of the recipient beneficiary in beneficiary data 236 and subject to budgetary constraints. As noted above, in some embodiments the amount of cryptocurrency allocated by voucher issuer 216 depends on income, number of dependents, sex and/or employment status.

Step 512 also includes recording the voucher issuing transaction in a blockchain in blockchain network 102. Optionally, the issued voucher or vouchers can be stored by cryptocurrency controller 214 in vouchers store 240 of regulating authority server 104, by cryptocurrency controller 314 in vouchers store 330 of authorized provider system 106 and by cryptocurrency controller 416 in vouchers store 428 of beneficiary device 108 (constituting so-called 'cold storage').

Optionally, the voucher may be stored on beneficiary device 108, and data indicating the completion of the transaction (and issuance of the voucher) may be received by regulating authority server 104 from blockchain network 102. For example, after completion of the voucher issuing transaction, blockchain network 102 may send confirmation of completion of the transaction to regulating authority server 104.

At step 514, the beneficiary controls beneficiary device 108 to buy and pay for prescribed goods and/or services from an authorized provider, whether in a shop or online, using the issued voucher(s) in full or in part. This transaction is mediated by purchase controller 414 of beneficiary computing device 108, which controls payment generator 420 to initiate the requisite payment, and sale controller 312 of authorized provider computing system 106, which controls purchase transaction authorizer 316 to obtain the consent to the purchase of authorized provider. The sale process, once consent is given by the authorized provider, includes blockchain network 102 validating the eligibility of the purchase request, based on the rules binding the voucher identified in the purchase request, unbinding the set of rules from the purchase amount of the voucher when the proposed purchase is approved or completed, and recording the corresponding cryptocurrency transaction in blockchain network 102 (comprising a transfer of the purchase amount from a user identifier associated with the user to an authorized provider identifier associated with the authorized provider). Subsequently, the beneficiary may request a refund, should the purchased goods and/or services be defective or inadequate (and/or, where applicable, fail to be delivered in a stipulated timeframe). At step 516, system 100 determines whether the beneficiary has initiated a refund request, by controlling beneficiary device 108 and thereby activating refund request generator 418, which generates a refund request that comprises a refund transaction identifier (identifying the purchase transaction, which appears as a block in the same blockchain as the voucher(s) used to make the purchase). Blockchain network 102 then forwards the refund request as a blockchain transaction to authorized provider system 106.

If, at step 516, blockchain network 102 detects a refund request, processing continues at step 518, where refund controller 320 of authorized provider system 106 determines whether the refund request is valid; alternatively, the validity of the refund request can be assessed by a suitable digital contract on blockchain network 102. A refund request is valid if made within a preset time period after purchase (e.g. 14 days), though that period may differ according to circumstances. For example, a greater period may be allowed for goods ordered online and delivered (e.g. 21 days), or the time period may be the same as in-store purchases but calculated from the date of delivery.

If, at step 518, the refund request to found to be valid, processing continues at step 520 where authorized provider system 106 responds to the finding of validity of the refund request by injecting the appropriate amount of cryptocurrency (being the value of the refund) into blockchain network 102.

At step 522, blockchain network 102 responds by generating a voucher by binding the refunded cryptocurrency with a set of rules from rules store 242; the set of rules is generally the same as the rules that originally bound the voucher(s) used to make the purchase, though it is envisaged that a modified set of rules may be used if the circumstances of the beneficiary have changed (by which is meant changed materially) since the original purchase or since the issuance of the voucher(s) used to make the purchase. Thus, in this step an earmarked voucher is generated in blockchain network 102. In some embodiments, the voucher generation may be performed via the use of digital contracts from contracts store 244. In certain embodiments, the refund is instead effected by blockchain network 102 by modifying the voucher(s) used to make the purchase (whether now with a zero or finite value) by increasing the value of the cryptocurrency of that voucher or those vouchers by the value of the refund. In doing so, the refunded cryptocurrency inherits the rules that bind that voucher or those vouchers.

At step 524, the generated voucher is allocated to the original beneficiary via the Beneficiary Identifier associated with the beneficiary (and stored in beneficiary data 236 and in beneficiary ID 426) in a voucher allocation transaction. Optionally, completed refund transaction data may be received by authorized provider system 106 from blockchain network 102. For example, after completion of the voucher allocation transaction, blockchain network 102 may send confirmation of completion of the transaction to regulating authority server 104. (It will be appreciated that step 524 is unnecessary if, at step 522, the refund is effected by crediting an existing voucher or vouchers.)

Processing then returns to step 514 at such time as the beneficiary again wishes to make a purchase.

If, at step 516, blockchain network 102 does not detect a refund request, or if, at step 518, the refund request is found to be invalid, processing continues at step 526. This step, which corresponds to a successful transaction, involves blockchain network 102 transferring the purchase price from the voucher(s) employed by the beneficiary to make the purchase to the authorized provider system 106. This may entail exhausting the entire value of the voucher(s) used to make the purchase. However, if the purchase price is less than the value of the voucher(s) used to make the purchase, this will involve either (i) modifying the voucher(s) so as to reduce its or their total value by the purchase price or (ii) issuing a new voucher to the beneficiary (as 'change') with a value equal to original total value of the employed voucher (s) reduced by the purchase price.

In all three cases, blockchain network 102 unbinds the earmarking set of rules from the cryptocurrency transferred to authorized provider system 106, such that unbound cryptocurrency is generated. This may also be facilitated by a digital contract in blockchain network 102, in response to the transfer of the cryptocurrency to authorized provider system 106. If any new vouchers are issued to the beneficiary, blockchain network 102 binds the cryptocurrency of that new voucher or those new vouchers with the set of rules that bound the voucher(s) used to make the purchase, though it is again envisaged that a modified set of rules may be used if the circumstances of the beneficiary have changed since the purchase was made or since the issuance of the voucher (s) used to make the purchase.

As a consequence, the authorized provider is allocated a sum of unbound or unrestricted cryptocurrency. That is, beneficiary uses the voucher(s) to make the payment, but through system 100, the authorized provider receives unrestricted cryptocurrency as payment. The unbinding may be performed either before the authorized provider receives the cryptocurrency, or afterwards. Furthermore, in some embodiments, the authorized provider receives the cryptocurrency before the refund period expires, but must issue a refund (as described above) should a valid refund request subsequently be received; in one variation, the authorized provider receives the cryptocurrency before the refund period expires, but the cryptocurrency is unbound after the expiry of the refund period if no valid refund request is received.

At step 528, the authorized provider retains, redeems or spends the now-unrestricted cryptocurrency (a redemption process that is described below). Processing then ends.

In some embodiments, the set(s) of rules may be implemented via a digital contract or contracts on blockchain network 102. As used herein, the term "digital contract" refers to a self-executing contract with the terms of the agreement between buyer and seller being directly written into lines of code. The code and the agreements contained therein exist across a distributed, decentralised blockchain network, blockchain network 102 being an example of such a distributed, decentralised blockchain network. In this embodiment as described above, the set of rules earmarks the vouchers so that they may only be used in a defined set of transactions with a defined set of authorized providers. For example, a holder of a voucher may be able to purchase milk from a certified supermarket, but may not be able to purchase cigarettes (or perhaps even premium organic milk) from the same supermarket using that voucher.

A voucher is thus generated by binding a quantity of the cryptocurrency with a set of rules, such as by attaching a digital contract to the cryptocurrency. By unbinding the set of rules from the voucher, such as by detaching the digital contract from the voucher, unrestricted cryptocurrency is regenerated. Such binding and unbinding may also be performed using other digital contracts of blockchain network 102.

Distribution Process

Figure 6:
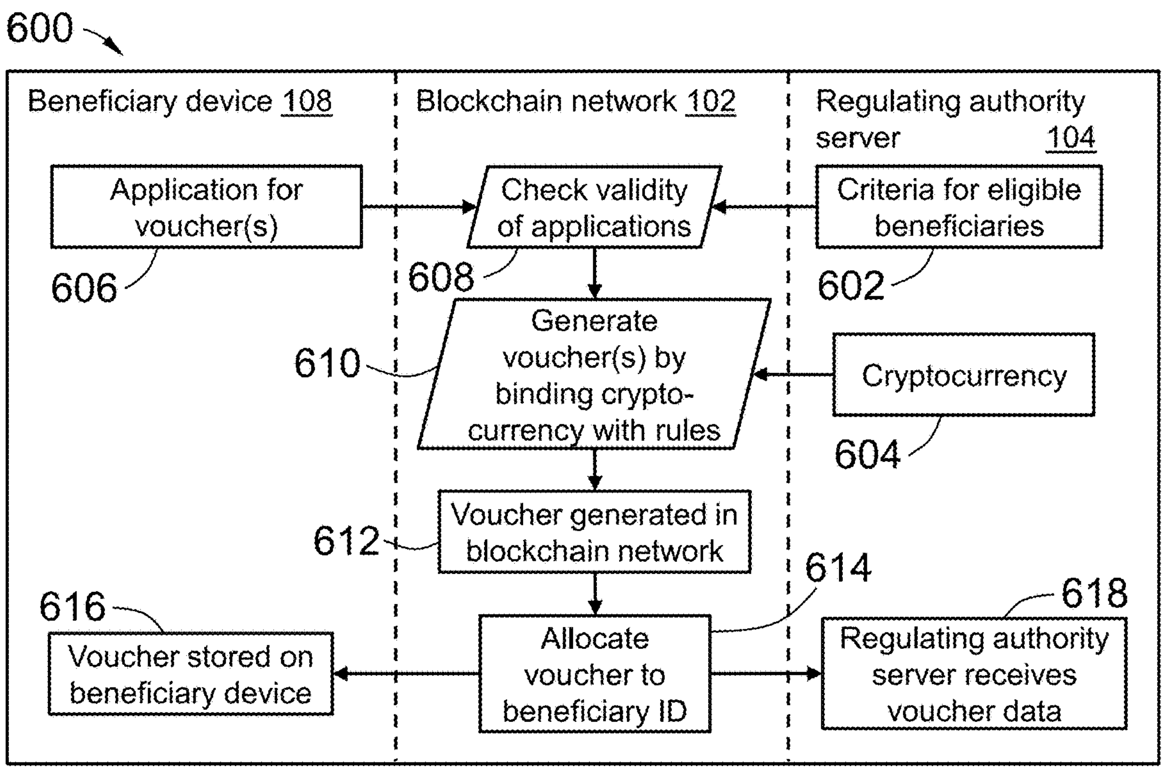
FIG. 6 is a schematic architectural diagram illustrating the voucher distribution process of the blockchain based voucher system of FIG. 1.

FIG. 6 is a schematic architectural diagram 600 illustrating the voucher distribution process of system 100 of this embodiment, corresponding to steps 502 to 512 of flow diagram 500.

At step 602, regulating authority server 104 inputs the criteria for eligible beneficiaries into blockchain network 102 and at step 604 injects cryptocurrency (with cryptocurrency injector 220) into blockchain network 102.

At step 606, a beneficiary used beneficiary device 108 to submit an application for a voucher or vouchers. At step 608, blockchain network 102 checks the validity of the application using the criteria provided. In some embodiments, such verification may be performed by the use of digital contracts.

At step 610, blockchain network 102 generates a voucher by binding a sum of the cryptocurrency with a set of rules. At step 612, therefore, an earmarked voucher is generated in blockchain network 102. In some embodiments, the set of rules may be contained within a digital contract or contracts. In some embodiments, the binding of the set of rules, and thus the voucher generation, is be performed by the use of other digital contracts.

At step 614, the voucher is allocated to the beneficiary using the beneficiary ID in a voucher allocation transaction. Optionally, at step 616 the voucher may be stored on beneficiary device 108, and at step 618 data indicating the completion of the transaction (and issuance of the voucher)

may be received by regulating authority server 104 from blockchain network 102, indicating the completion of the transaction.

Purchase Process

Figure 7:
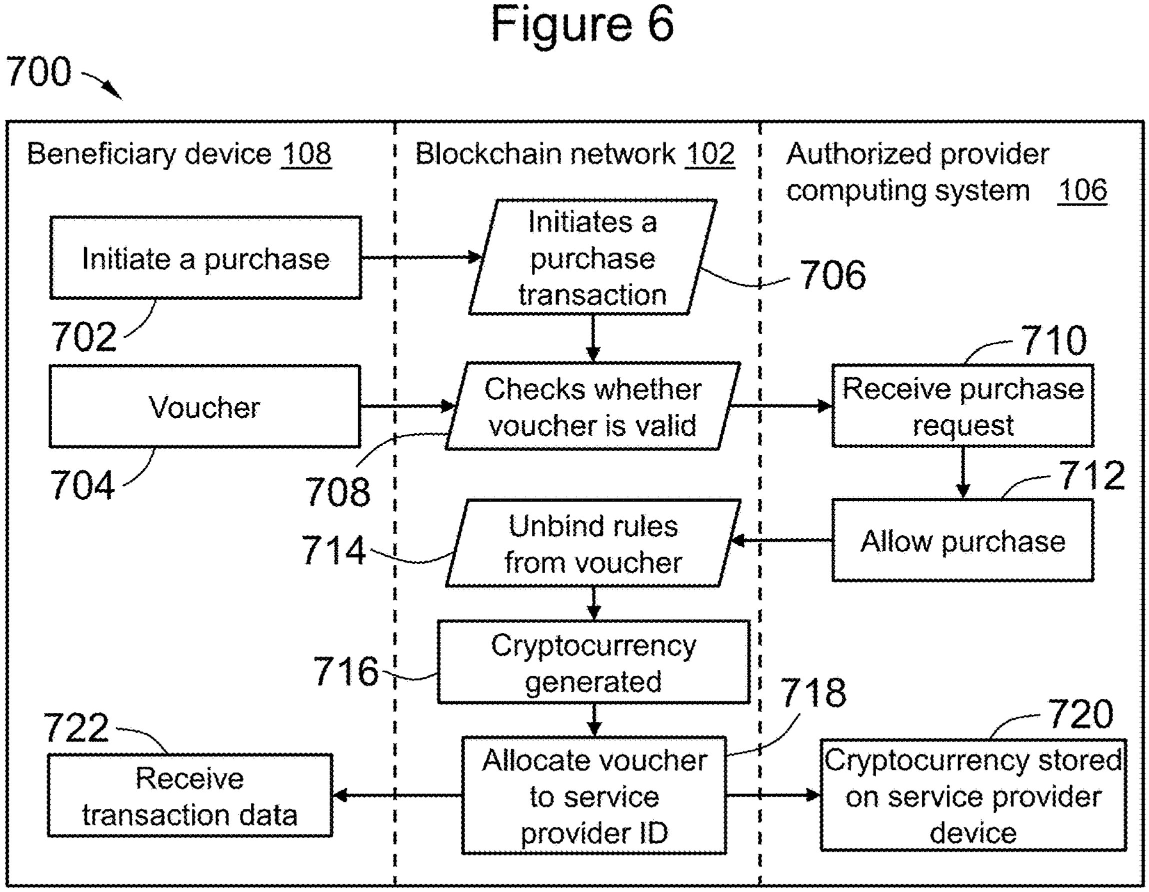
FIG. 7 is a schematic architectural diagram illustrating the purchase process of the blockchain based voucher system of FIG. 1.

FIG. 7 is a schematic architectural diagram 700 illustrating the purchase process of conducted by system 100, corresponding to steps 514, 526 and 528 of flow diagram 500.

At step 702, the beneficiary used beneficiary device 108 to initiate a purchase. This includes, at step 704, beneficiary device 108 associating a voucher with the purchase.

At step 706, blockchain network 102 initiates a purchase request transaction, generating a purchase transaction identifier. At step 708, blockchain network 102 checks the validity of the voucher by checking the earmarking set of rules. If the voucher is found to be valid, blockchain network 102 forwards the purchase request transaction to authorized provider system 106. In some embodiments, the verification may be performed via the use of digital contracts.

At step 710, authorized provider system 106 receives the purchase request transaction from blockchain network 102 and, at step 712 allows the purchase. The authorized provider does so by controlling purchase transaction authorizer 316 of authorized provider system 106 to allow the transaction, by selecting an approval button rather than a rejection button (comprising, for example, a "Yes" and a "No" button respectively) when prompted by authorized provider system 106 to indicate whether the transaction should be allowed or rejected. (The authorized provider might instead select "No" if the purchase request transaction indicated an unacceptably low proposed purchase price.) In another embodiment, the purchase request transaction is automatically approved if it is consistent with the conditions associated with the offered goods or services (e.g. price, delivery location).

At step 712, blockchain network 102 receives approval electronically of the purchase from authorized provider system 106 (cf. para. 97) and unbinds the earmarking set of rules from the voucher. At step 716 unrestricted cryptocurrency is thereby generated. In some embodiments, the unbinding may be performed via the use of digital contracts.

At step 718, the cryptocurrency is allocated to the authorized provider via an authorized provider ID. Optionally, at step 720 the cryptocurrency may be stored on authorized provider system 106, and at step 722 the completed purchase transaction data may be received by beneficiary device 108.

Refund Process

Figure 8:
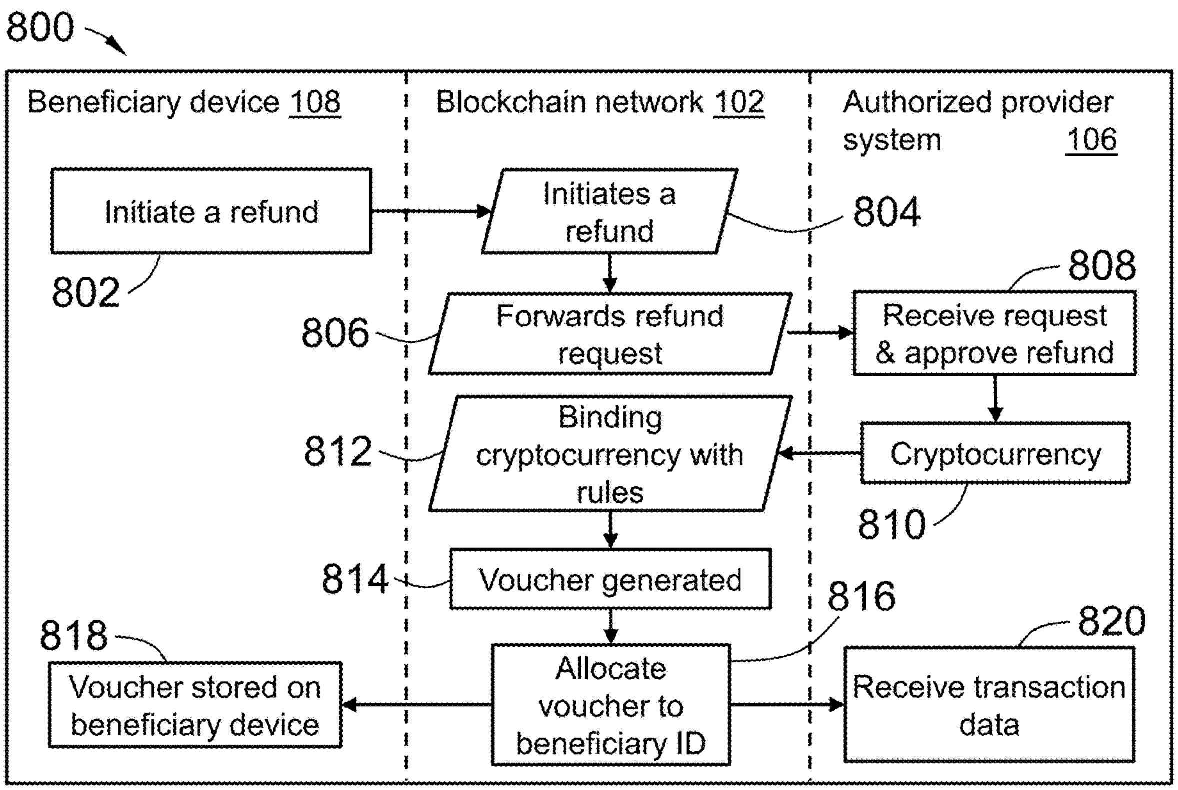
FIG. 8 is a schematic architectural diagram illustrating the refund process of the blockchain based voucher system of FIG. 1.

FIG. 8 is a schematic architectural diagram 800 illustrating the refund process of system 100 of this embodiment, corresponding to steps.

At step 802, the beneficiary initiates a refund request by controlling beneficiary device 108, which in response controls refund request generator 418 the refund request.

At step 804, blockchain network 102 generates a refund transaction comprising a refund request and a refund transaction identifier. At step 806, blockchain network 102 forwards the refunds transaction to authorized provider system 106.

At step 808, authorized provider system 106 receives the refund transaction from blockchain network 102 and, if the request is valid, approves the refund transaction. At step 810, authorized provider system 106 injects the appropriate amount of cryptocurrency (being the value of the refund) into blockchain network 102.

At step 812, blockchain network 102 binds the refunded cryptocurrency with a set of rules, and hence at step 814 generates an earmarked voucher in blockchain network 102. In some embodiments, the voucher generation may be performed via the use of digital contracts.

At step 816, the voucher is allocated to the beneficiary by a beneficiary ID. Optionally, at step 818 the voucher may be stored on beneficiary device 108, and at step 820 "completed refund transaction" data may be received by authorized provider system 106.

Redemption Process

Figure 9:
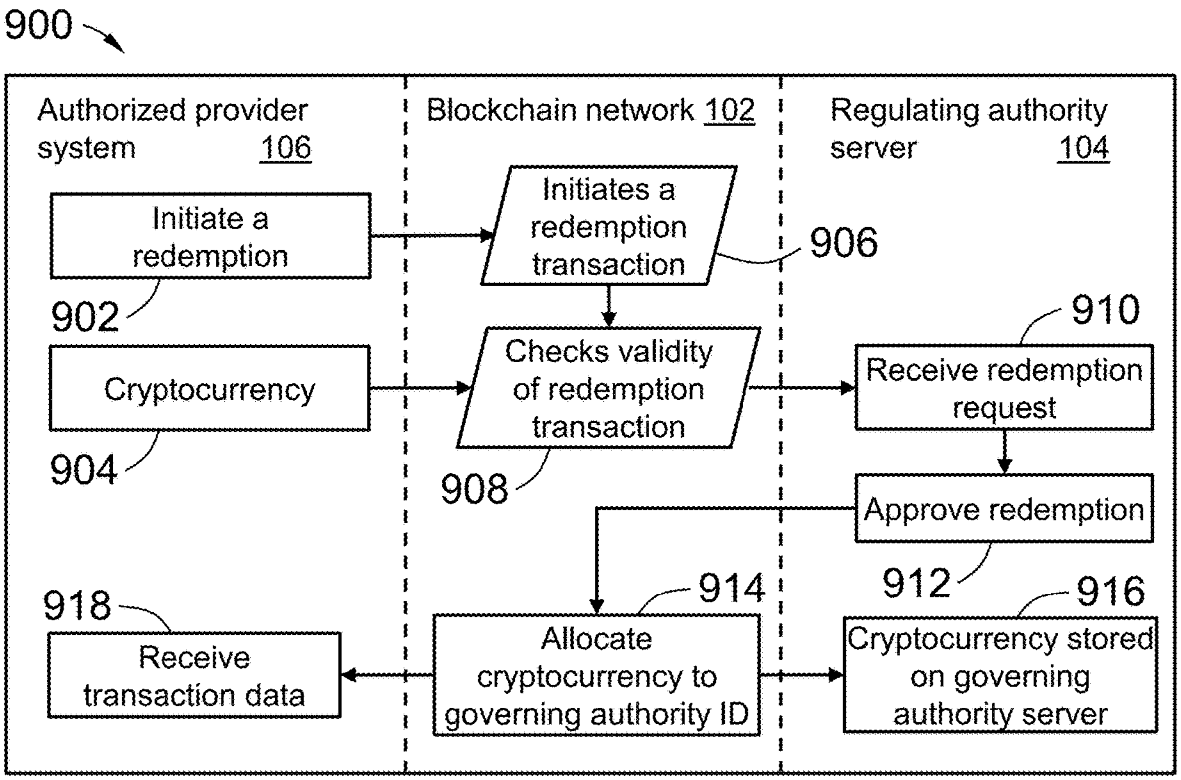
FIG. 9 is a schematic architectural diagram illustrating the redemption process of the blockchain based voucher system of FIG. 1.

FIG. 9 is a schematic architectural diagram 900 illustrating the redemption process of the blockchain based voucher system 100 of this embodiment, as referred to in 528 of flow diagram 500.

At step 902, the authorized provider initiates a redemption of a sum of cryptocurrency for official currency using authorized provider system 106 (which employs redemption controller 218) and at step 904 injects an amount of the cryptocurrency equal to the requested redemption into blockchain network 102.

At step 906, blockchain network 102 initiates a redemption transaction, comprising a redemption request and a redemption transaction identifier. Blockchain network 102 then, at step 908, checks the validity of the redemption transaction against conditions, such as that a predefined period of time has elapsed since the original transaction (e.g. one month), and/or the beneficiary has satisfactorily evaluated the offered good or service through the network; if the redemption request is found to be valid, blockchain network 102 forwards the redemption transaction to regulating authority server 104. In some embodiments, the verification may be performed with the help of digital contracts; such a contract would compare the information in the redemption transaction with the redemption conditions contained in the smart contract.

At step 910, regulating authority server 104 receives the redemption request from blockchain network 102 and at step 912 allows the redemption.

At step 914, blockchain network 102 allocates the voucher to the regulating authority via a regulating authority ID. Optionally, at step 916 the voucher may be stored on regulating authority server 104, and at step 918 the completed redemption transaction data may be received by authorized provider system 106. In another embodiment, the voucher ceases to exist once redeemed, but it is envisaged that it will commonly be desirable or advantageous to store the voucher so that, for example, it can be reissued. Furthermore, certain blockchain systems have a cap on the total number of coins that are allowed to be generated.

Blockchain based voucher system 100 can also be used both to streamline the collection of tax (typically by the government) and/or to encourage the provision of specific goods or services (whether by existing or new businesses).

In a first example, system 100 can be configured to allow authorized providers to pay their taxes and fees using the vouchers. This can be done in either of two ways. The tax can be treated like any other good or service and, once a voucher is rendered unbound, it can be redeemed by an authorized provider directly with the government (or tax collection agency) in the manner described above.

However, in an alternative arrangement, an authorized provider does not pay tax (in formal currency) to the government arising from sales paid for by the redemption of one or more vouchers. Instead, vouchers (or specific vouchers earmarked as valid for this purpose, bound by associated rules stored in rules store 242) are issued by the regulating authority with a value, or with a redeemable value, that treats such taxes as already paid-either in full or in part. This can be done for all vouchers issued by the regulating authority, or certain vouchers may be issued suitably earmarked, such that income arising from the redemption of the vouchers (or the earmarked vouchers) attract no further income or other tax, or attract a reduced amount of such income or other tax. Alternatively, such vouchers can be issued as attracting a fixed, predefined tax credit which, when used by a particular authorized provider, can be offset against a future tax obligation.

Consequently, the authorized provider—in accepting such vouchers—can at least partially exclude the 'income' arising from the payment effected by redemption of that or those vouchers from any subsequent calculation of the applicable tax. This can reduce cost by reducing some accounting steps. This exclusion amounts to a tax credit that can alternatively be included in the authorized provider's tax return as a traditional tax credit-especially if such income only partially meets the normally associated tax obligation of the authorized provider.

Furthermore, the voucher is itself proof of payment of the resulting tax obligation: it acts as a tax credit receipt. Additionally, this increased functionality-whereby the vouchers can be used to pay tax-increases the liquidity of the vouchers as a complementary currency.

Moreover, it will be appreciated that a government also has many suppliers, and some or all of them can also become authorized providers (or be deemed as such by the government); the government can then pay those suppliers with vouchers. Using this mechanism, however, the government can also pay those suppliers with vouchers and, in doing so, create either a reduced or no attendant tax obligation.

If there are a plurality of authorized providers who prefer to pay their taxes using the vouchers, this mechanism of system 100 encourages competition between them: each such authorized provider will wish to collect a sufficient number of vouchers to pay off their taxes, so may reduce its prices to achieve this goal. If such a provider fails to do so, it can pay the shortfall in cash, but if the provider collects more than the required tax credit, it can use the excess as an additional complementary currency.

In a second example, the regulating authority issues vouchers that encourage the provision of specific goods or services, whether by existing or new businesses (and in the latter instance to thereby encourage new businesses of a desired type). This is effected by the regulating authority issuing certain vouchers earmarked as valid for redemption for a predefined set of goods and/or services, or with a predefined subset of authorized providers, or both, in economic sectors that the government wishes to promote. Importantly, such vouchers are issued in advance of when any associated taxes (or, if desired, taxes generally in a particular tax period) become payable by the authorized providers in that sector. To this end, regulating authority server 104 is provided with or configured to access to tax calendar information, and is configured to issue such vouchers sufficiently in advance of the close of when tax would become due (which, it will be appreciated, may be significantly later than the close of the instant tax period) that the vouchers may be expected to have been used in that tax period, such as based on past user behaviour.

The authorized providers in that sector are then in a position to redeem the vouchers before those tax payments become due. In this manner, the cash-flow of the authorized providers in the targeted sectors is being supported by the government, so the vouchers serve to support, for example, new or desired community services, and thereby act as social impact bonds.

It should be further appreciated that, in the embodiments described above, computing devices 104, 106 and/or 108 may—in various variations thereof—be implemented using hardware, software, firmware, non-transitory computer readable media having instructions stored thereon, or a combination thereof and may be implemented in one or more computer systems or other processing systems. Hardware, software, or any combination thereof may embody modules and components used to implement the methods as described in this present application.

When programmable logic is used, that logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the computing devices of the embodiments above described.

A processor as discussed herein may be a single processor, a plurality of processors, or combinations thereof. Processors may have one or more processor "cores." The terms "computer program medium," "computer readable medium," "non-transitory computer readable medium," and "computer usable medium" as discussed herein are used to generally refer to tangible media.

Various embodiments of the present application are described in terms of the examples of FIGS. 2 to 4. After reading this description, it will be apparent to a person skilled in the relevant art how to implement the present application using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

The processors 208, 308, 408 may be special purpose or general purpose processors specifically configured to perform the functions discussed herein. They may be operably connected to external the telecommunications network via respective communication controllers, in turn connected to transmitters and receivers. Network 110 may be any network suitable for performing the functions as disclosed herein and may comprise a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. Exemplary transmitters and receivers include a modem, a network interface (e.g., an Ethernet card), a communications port, a PCMCIA slot and card, etc.

Software and data transferred via transmitters and receivers may be in the form of signals, which may be electronic, electromagnetic, optical, or other signals as will be apparent to persons having skill in the relevant art. The signals may travel via a communications path, which may be configured to carry the signals and may be implemented using wire, cable, fibre optics, a phone line, a cellular phone link, a radio frequency link, etc.

Memory 210, 310 and 410 (e.g., random access memory, read-only memory, etc.), and may also include or be accompanied by storage comprising a hard disk drive and a removable storage drive, such as a floppy disk drive, a magnetic tape drive, an optical disk drive, a flash memory, etc. In some embodiments, this storage includes alternative means for allowing computer programs or other instructions to be loaded into the computing devices 104, 106 and/or 108, such as a removable storage drive and an interface. Examples of such means may include a program cartridge and cartridge interface (e.g., as found in video game systems), a removable memory chip (e.g., EEPROM, PROM, etc.) and associated socket, and other removable storage units and interfaces as will be apparent to persons having skill in the relevant art.

Data stored in computing devices 104, 106 and/or 108 may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

Computing devices 104, 106 and/or 108 may further include an output device, configured to allow data to be transferred between the respective device and user interfaces 204, 304, 404. Such an output device comprises, for example, a high-definition multimedia interface (HDMI), digital visual interface (DVI), video graphics array (VGA), etc. User interfaces 204, 304, 404 may include any suitable type of display for displaying data transmitted via the output device, such as a cathode ray tube (CRT) display, liquid crystal display (LCD), light-emitting diode (LED) display, capacitive touch display, thin-film transistor (TFT) display, etc.

User interfaces 204, 304, 404 also comprise input devices such as touch panels, keyboards, mice, joysticks, digital cameras and microphones. Audio input devices (such as the microphones as mentioned) may be used for purposes including speech recognition. Image input devices (such as the digital cameras as mentioned) may be used for purposes including gesture recognition.

Computer program code and computer readable medium may refer to memories, such as memory 210, 310 and 410, which may be memory semiconductors (e.g., DRAMs, etc.). These computer program code 230, 324 and 422 provide software to the respective computing devices 104, 106, 108. Such computer program code, when executed, controls devices 104, 106, 108 to implement at least in part, the methods discussed herein.

Processors 208, 308, 408, as described above, comprise modules or engines configured to perform the functions of computing devices 104, 106, 108 respectively. Each of the modules or engines may be implemented using hardware and, in some instances, may also utilise software, such as corresponding to program code stored in memory 210, 310, 410, respectively. In such instances, program code may be compiled by processors 208, 308, 408 (e.g., by a compiling module or engine) prior to execution by the hardware of computing devices 104, 106, 108. For example, the program code 230, 324, 422 may be source code written in a programming language that is translated into a lower level language, such as assembly language or machine code, for execution by processors 208, 308, 408 and/or any additional hardware components of devices 104, 106, 108. The process of compiling may include the use of lexical analysis, preprocessing, parsing, semantic analysis, syntax-directed translation, code generation, code optimization, and any other techniques that may be suitable for translation of program code into a lower level language suitable for controlling devices 104, 106, 108 to perform the functions disclosed herein. It will be apparent to persons having skill in the relevant art that such processes result in devices 104, 106, 108 being one or more specially configured computer systems uniquely programmed to perform the functions discussed above.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

What is claimed is:

1. A computer-implemented blockchain based voucher method, wherein the voucher promotes financial inclusion by enabling secure, rule-based transactions through blockchain for underserved populations and integrates resource mobilization by allocating cryptocurrency-backed vouchers to underserved populations, enhancing access to financial tools, comprising:

recording, via a cryptographically secured smart contract deployed on a user computing device, in a blockchain network with at least one blockchain based voucher, a purchase request initiated by a user possessing at least one blockchain-based voucher, wherein: 1) the purchase request identifies a proposed purchase with an authorized provider, a purchase amount and the voucher, and 2) the voucher comprises a sum of cryptocurrency encoded with a unique hash identifier, and a set of cryptographically enforced rules earmarking the voucher to be usable only in transactions between the user and any of a set of one or more authorized providers of goods or services, and wherein the purchase amount is a value that is less than or equal to the total value of the voucher;

validating, by the blockchain network, the eligibility of the purchase request using a distributed consensus mechanism based on reciprocity, referred to as proof of use (POU), and by decoding and verifying the set of rules bound to the voucher;

unbinding, via a smart contract event triggered upon the completion of the proposed purchase, the set of rules from the purchase amount of the voucher; and recording, in the blockchain network, a cryptographically secured cryptocurrency transaction, wherein the transaction comprising a transfer of the purchase amount from a user identifier associated with the user to an authorized provider identifier associated with the authorized provider, maintaining an immutable record of transaction;

comprising unbinding, via a smart contract deployed in the blockchain network, the set of rules associated with the purchase amount of the voucher after expiry of a predefined refund period, the expiry is determined based on a timestamp encoded in the blockchain ledger, and the unbinding process is automatically triggered by a smart contract upon detection of the expired refund period; and issuing one or more vouchers that integrate tax incentives by being valid for paying taxes or providing tax credits, thereby promoting compliance and ease of use, wherein the vouchers:

(i) are valid for paying tax to a taxation authority once unbound, wherein the unbinding process is governed by a smart contract that ensures compliance with tax regulations and automates the tax payment process, integrating tax incentives to promote broader adoption; and/or (ii) are cryptographically bound by one or more set of rules encoded in the blockchain ensuring the vouchers are usable to pay tax to a taxation authority such that the taxation authority is effectively an authorized provider; and/or (iii) are associated with a tax credit suitable, enabling the user to discharge tax obligations by presenting the vouchers to the taxation authority; and/or (iv) are bound by a set of smart contract-enforced rules, earmarking the vouchers to be usable only in transactions between the user and any of a predefined subset of the authorized providers, or in purchasing a predefined set of goods and/or services, and are issued in advance of when any associated taxes, or taxes generally in an instant tax period, become payable by authorized providers accepting the vouchers so earmarked.

2. A method as claimed in claim 1, further comprising:

receiving, by the blockchain network, an encrypted voucher application transaction from a user computing device, wherein the voucher application transaction comprises at least a user identifier associated with the user, encrypted and transmitted using asymmetric cryptographic key pairs including public and private keys to ensure secure communication and user authentication;

verifying, via the blockchain network, the user's eligibility by decrypting the user identifier and comparing data associated with the user with one or more eligibility criteria stored immutably on the blockchain or accessible via external data oracles;

generating, via a smart contract in the blockchain network, a voucher by binding a sum of cryptocurrency with a set of cryptographically enforced rules, the rules specifying authorized providers and valid use cases for the voucher; and recording, in the blockchain network ledger, a voucher allocation transaction, wherein the allocation transaction includes a cryptographically hashed record of the voucher, the user identifier, and associated roles, ensuring transparency, immutability, and traceability.

3. The method of claim 2, wherein the voucher allocation transaction includes allocating the voucher from a regulating authority identifier to the user identifier by generating a cryptographically signed transaction.

4. The method of claim 1, further comprising:

generating, by the user computing device, a cryptographically signed refund request transaction configured to request a refund corresponding to part or all of the purchase transaction, wherein the refund request transaction comprising a refund amount of the cryptocurrency and a transaction identifier identifying the purchase transaction;

recording, by the blockchain network, the refund request transaction in the blockchain network, such that the refund request transaction is securely transmitted and received by an authorized provider computing system;

validating and approving, by the authorized provider computing system, the refund request transaction using cryptographic verification methods and recording a refund approval transaction indicative thereof in the blockchain network;

generating, via a smart contract deployed in the blockchain network, a new voucher by binding a sum of cryptocurrency with the set of cryptographically enforced rules, the new voucher comprising the refund amount of cryptocurrency; and recording a refund voucher allocation transaction in the blockchain, wherein the refund voucher allocation transaction comprising a transfer of the new voucher from the authorized provider identifier to the user identifier.

5. The method of claim 1, comprising subjecting, via a smart contract deployed in the blockchain network, the voucher to a hoarding tax scheme once the voucher has been unbound from the set of rules, wherein the hoarding tax scheme is dynamically calculated based on a predefined set of rules stored immutably within the smart contract, and the tax is applied periodically to reduce voucher's value in proportion to the duration it remains unutilized after unbinding.

6. The method of claim 1, further comprising:

generating, by an authorized provider computing system, a cryptographically signed redemption request transaction for a requested redemption, wherein the redemption request transaction includes a redemption amount of one or more vouchers, and metadata such as a unique transaction identifier and a timestamp for verification purposes;

recording the redemption request transaction in the blockchain network, such that the redemption request transaction is securely transmitted to a regulating authority server via an encrypted communication channel;

validating, by the blockchain network, the eligibility of the requested redemption through a smart contract that evaluate compliance with a set of one or more redemption conditions; and recording a voucher redemption transaction in the blockchain, the voucher redemption transaction comprising a transfer of the redemption amount from the authorized provider identifier to a regulating authority identifier associated with the regulating authority, and an immutable, cryptographically hashed record ensuring transparency, traceability, and auditability of the redemption process.

7. The method of claim 6, wherein the set of redemption conditions includes a redemption grace period, usage rules, and/or a satisfactory transaction evaluation by the user and stored immutably in the blockchain network.

8. The method of claim 6, further comprising:

(i) approving, via the blockchain network, the proposed redemption transaction using a smart contract that validates the transaction against predefined conditions, and automatically triggers approval upon successful validation; and/or (ii) the regulating authority electronically paying the authorized provider the redemption amount in standard currency or cryptocurrency, wherein the payment is processed through secure payment gateway or a blockchain-based transfer mechanism.

9. A computer program product, comprising a non-transitory computer-readable medium, comprising computer program code configured to, when loaded into a computing system and executed thereon, cause the computing system to perform the method as claimed in claim 1.

10. A non-transitory computer-readable medium, comprising the computer program product of claim 9.

* * * * *